(12) United States Patent  
Chen

(10) Patent No.: US 9,104,063 B2  
(45) Date of Patent: Aug. 11, 2015

(54) 3D IMAGE DISPLAY APPARATUS AND DRIVING METHOD THEREOF

(71) Applicant: AU OPTRONICS CORP., HsinChu (TW)

(72) Inventor: Chih-Hsieh Chen, HsinChu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

(21) Appl. No.: 13/846,082

(22) Filed: Mar. 18, 2013

(65) Prior Publication Data

US 2014/0104146 A1    Apr. 17, 2014

(30) Foreign Application Priority Data

Oct. 11, 2012    (TW) .............................. 101137546 A

(51) Int. Cl.
- *G02F 1/1335* (2006.01)
- *G09G 3/36* (2006.01)
- *G02B 27/26* (2006.01)

(52) U.S. Cl.
CPC .......... *G02F 1/133528* (2013.01); *G02B 27/26* (2013.01); *G09G 3/36* (2013.01)

(58) Field of Classification Search
CPC .............. G02F 1/133528; G02F 2001/133638; G02F 2202/40; G02B 27/26; G02B 5/30; H04N 13/0434; H04N 13/0438; G09G 3/36
USPC ........... 345/57, 87; 348/58, E13.038, E13.04, 348/E13.044, 57; 349/15, 96; 359/462, 359/485.03, 489.07; 362/19

See application file for complete search history.

(56) References Cited

U.S. PATENT DOCUMENTS

| | | | |
|---|---|---|---|
| 2002/0044350 A1* | 4/2002 | Sato et al. ..................... | 359/465 |
| 2005/0285997 A1* | 12/2005 | Koyama et al. ............... | 349/117 |
| 2008/0062259 A1* | 3/2008 | Lipton et al. .................... | 348/58 |
| 2008/0094545 A1* | 4/2008 | Ko ................. | 349/96 |
| 2010/0073347 A1* | 3/2010 | Takagi et al. .................. | 345/211 |
| 2010/0302634 A1 | 12/2010 | Jung | |
| 2011/0157333 A1* | 6/2011 | Lee et al. ........................ | 348/56 |
| 2012/0019733 A1* | 1/2012 | Kim et al. ....................... | 349/15 |
| 2012/0206665 A1* | 8/2012 | Sakai et al. ..................... | 349/13 |
| 2012/0212814 A1* | 8/2012 | Endo et al. ..................... | 359/465 |
| 2012/0229719 A1* | 9/2012 | Ishiguro ......................... | 349/15 |

FOREIGN PATENT DOCUMENTS

| | | |
|---|---|---|
| CN | 102566115 A | 7/2012 |
| TW | 201042285 | 12/2010 |

OTHER PUBLICATIONS

Taiwan Patent Office "Office Action", Jun. 6, 2014.

* cited by examiner

*Primary Examiner* — Lun-Yi Lao  
*Assistant Examiner* — Elliott Deaderick  
(74) *Attorney, Agent, or Firm* — WPAT, PC; Justin King

(57) ABSTRACT

A 3D image display apparatus includes a display unit, a first polarizer with a polarization axis, a second polarizer and a switching unit. The switching unit includes a first substrate, a second substrate and a liquid crystal layer. The first substrate is disposed with a first conductive layer on an inner surface thereof along a first direction and is electrically coupled to a first voltage source. The second substrate is parallel to the first substrate and disposed with a second conductive layer on an inner surface thereof along a second direction and is electrically coupled to a second voltage source. The first and second directions have an angle therebetween. The liquid crystal layer is disposed between the first and second substrates and includes a plurality of liquid crystals each having a slow axis.

11 Claims, 5 Drawing Sheets

3D IMAGE DISPLAY APPARATUS AND
DRIVING METHOD THEREOF

TECHNICAL FIELD

The present disclosure relates to a display apparatus and a driving method thereof, and more particularly to a three-dimensional (3D) display apparatus and a driving method thereof.

BACKGROUND

In recent years, display technology has been developed from two-dimensional (2D) images to three-dimensional (3D) images with the development of technology. Today, most of the liquid crystal displays (LCDs) are equipped with the 3D image display function and thereby providing the stereo visual experience to users. The 3D image display technologies can be realized by many means; wherein the passive 3D display technology has to be used with polarized glasses for separating the right-eyed and left-eyed images by way of space partitioning or time division.

However, in the current passive 3D display technology, the space partitioning might result in a halved resolution, decreasing brightness and insufficient vertical viewing angle. Therefore, some of the liquid crystal switching units is designed by way of the time division, such as the electrically controlled birefringence (ECB) or optically compensated birefringence (OCB) is a switch cell to make the time division, so as to improve the aforementioned halved resolution, decreasing brightness and insufficient vertical viewing angle issues.

To generate an electric field perpendicular to the liquid crystals and thereby changing the tile angles of the liquid crystals, the conventional liquid crystal switching unit needs a retardation film adhered on a side thereof for the compensation of the optical retardation. In addition, the conventional liquid crystal switching unit further needs a compensation film adhered on the other side thereof to improve the viewing angle. Thus, the additional retardation film and the compensation film accordingly raise the manufacturing cost of the 3D image display apparatus.

SUMMARY

An embodiment of the disclosure is to provide a 3D image display apparatus, which includes a display unit, a first polarizer, a second polarizer and a switching unit. The first polarizer has a polarization axis. The first and second polarizers are disposed on two opposite sides of the display unit, respectively. The switching unit and the display unit are disposed on two opposite sides of the first polarizer, respectively. The switching unit includes a first substrate, a second substrate and a liquid crystal layer. The first substrate is disposed with a first conductive layer on an inner surface thereof along a first direction. The first conductive layer is electrically coupled to a first voltage source configured to apply a first voltage. The second substrate is parallel to the first substrate and disposed with a second conductive layer on an inner surface thereof along a second direction. The second conductive layer is electrically coupled to a second voltage source configured to apply a second voltage. The first and second directions have an angle therebetween. The liquid crystal layer is disposed between the first and second substrates and includes a plurality of liquid crystals each having a slow axis. In an initial period, the slow axes of the liquid crystals are aligned in an initial direction by applying no voltage to the first and second conductive layers. In a first period, the slow axes of the liquid crystals are aligned in a first-period-slow-axis direction and thereby having a first angle relative to the polarization axis of the first polarizer by applying the first voltage to the first conductive layer. In a second period, the slow axes of the liquid crystals are aligned in a second-period-slow-axis direction and thereby having a second angle relative to the polarization axis of the first polarizer by applying the second voltage to the second conductive layer. The first and second angles each are equal neither to 0 nor 90 degrees, and the first period is different with the second period.

Another embodiment of the disclosure is to provide a driving method for a 3D image display apparatus, which includes: providing the 3D image display apparatus comprising a display unit, a first polarizer having a polarization axis, a second polarizer and a switching unit, wherein the first polarizer is disposed between the switching unit and the display unit, the second polarizer is disposed on the other side of the display unit, the switching unit comprises a first substrate, a second substrate and a liquid crystal layer, the first substrate comprises a first conductive layer arranged along a first direction, the second substrate is parallel to the first substrate and comprises a second conductive layer arranged along a second direction, the first and second directions have an angle therebetween, the liquid crystal layer is disposed between the first and second substrates and comprises a plurality of liquid crystals each having a slow axis, the slow axes of the liquid crystals are aligned in an initial direction by applying no voltage to the first and second conductive layers; applying, in a first period, a first voltage to the first conductive layer thereby aligning the slow axes of the liquid crystals in a first-period-slow-axis direction, wherein the first-period-slow-axis direction and the polarization axis of the first polarizer have a first angle therebetween; and applying, in a second period, a second voltage to the second conductive layer thereby aligning the slow axes of the liquid crystals in a second-period-slow-axis direction, wherein the second-period-slow-axis direction and the polarization axis of the first polarizer have a second angle therebetween, the first and second angles each are equal neither to 0 nor 90 degrees, and the first period is different with the second period.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
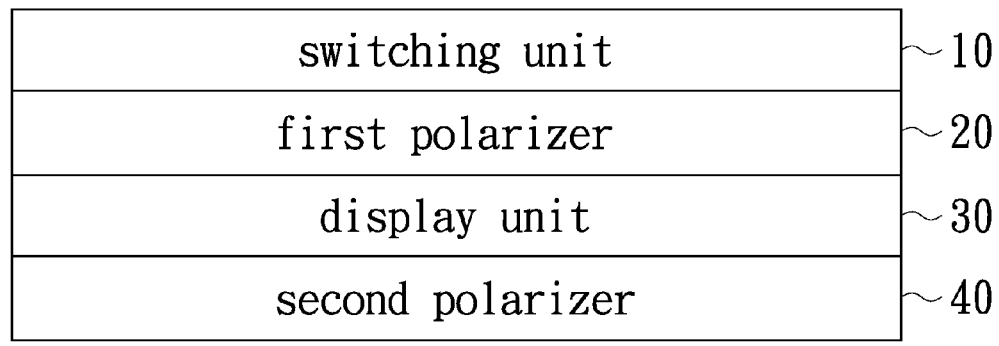
FIG. 1 is a schematic constructional diagram of a 3D image display apparatus in accordance with a preferred embodiment of the present disclosure.

FIG. 1 is a schematic constructional diagram of a three-dimensional (3D) image display apparatus 100 in accordance with a preferred embodiment of the present disclosure. As shown, the 3D image display apparatus 100 in this embodiment includes a switching unit 10, a first polarizer 20, a display unit 30 and a second polarizer 40. Specifically, the first polarizer 20 and the second polarizer 40 are disposed on two opposite sides of the display unit 30, respectively; the switching unit 10 is disposed on the first polarizer 20; and the first polarizer 20 is disposed between the switching unit 10 and the display unit 30.

Figure 3A:
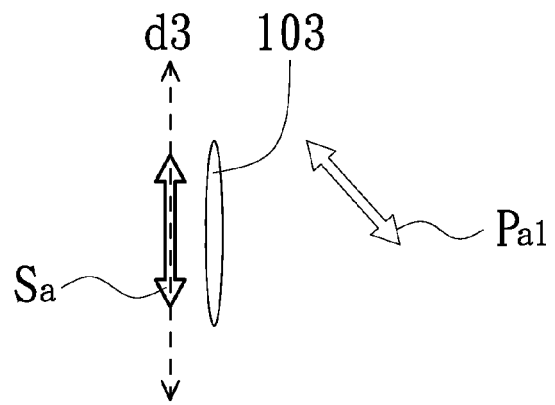
FIGS. 3A, 3B and 3C each are a schematic top view illustrating the slow axis of the liquid crystals with a specified angle relative to the first polarizing axis.

The first polarizer 20 has a first polarization axis Pa1 (shown in FIG. 3A). The display unit 30 can be a display panel; and the image displayed by the display unit 30 is converted into an image light source having a predetermined polarizing direction after passing through the first polarizer 20. In this embodiment, the first polarizer 20 and the second polarizer 40 are configured to have the polarization axes thereof perpendicular to each other. The switching unit 10 is configured to result in a specified optical retardation required for forming 3D images.

Figure 2A:
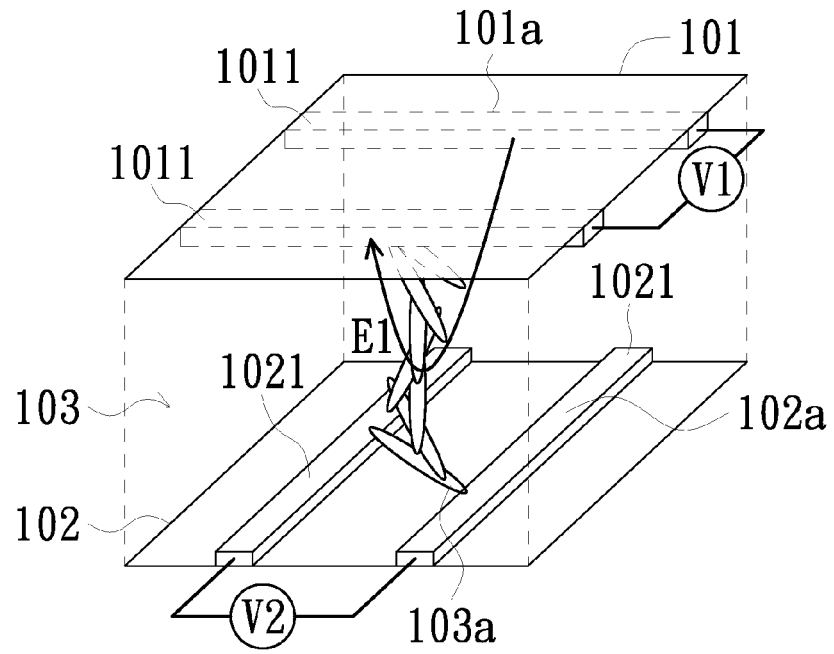
FIGS. 2A, 2B and 2C each are a schematic constructional diagram of the switching unit with a specified configuration in accordance with the preferred embodiment.
Figure 2B:
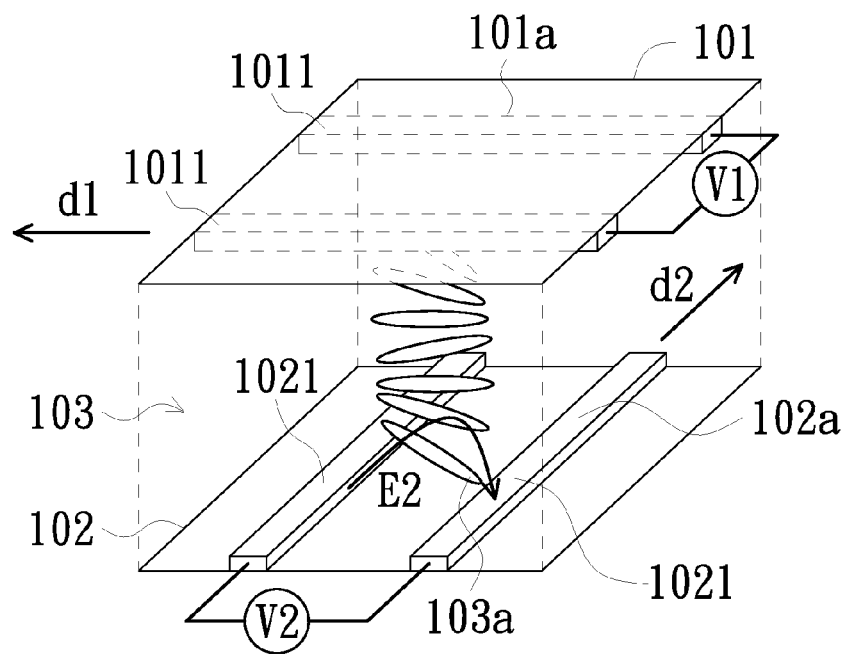
Figure 2C:
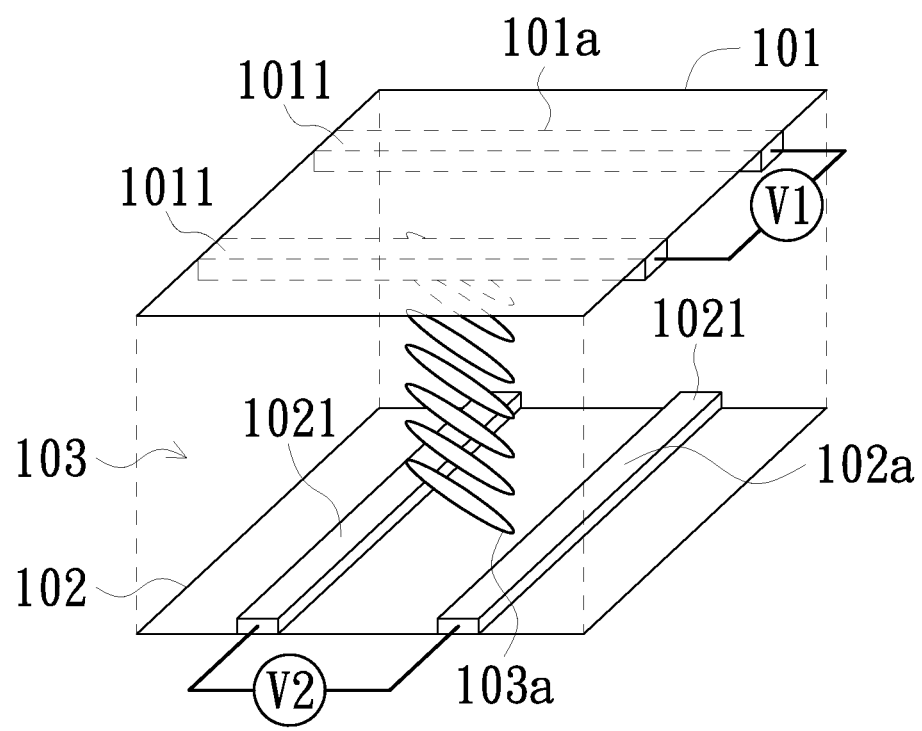

FIGS. 2A, 2B and 2C each are a schematic constructional diagram of the switching unit 10 with a specified configuration in accordance with the preferred embodiment. As shown, the switching unit 10 includes a first substrate 101, a liquid crystal layer 103 and a second substrate 102 parallel to the first substrate 101. The first substrate 101 and second substrate 102 are a transparent substrate, such as a glass or plastic substrate, or made of specified substrate materials having a transmittance approximately equal to or larger than 80%.

The first substrate 101 is disposed with a first conductive layer 101a, which includes a plurality of parallel strip electrodes 1011 and grooves, on a side thereof facing the second substrate 102; wherein the strip electrodes 1011 of the first conductive layer 101a are arranged along a first direction d1. In this embodiment, the first conductive layer 101a is electrically coupled to a first voltage source V1, which is configured to apply a first voltage for driving the switching unit 10. Preferably, the first conductive layer 101a is made of transparent conducting oxides (TCO) or thin metals; and the disclosure is not limited thereto. The transparent conductive oxides may include, but are not limited to, indium tin (ITO), indium zinc oxide (IZO), zinc oxide, aluminum (AZO), gallium zinc oxide (GZO), or indium molybdenum oxides (IMO); and the thin metals include silver (Ag), aluminum (Al) or an alloy thereof.

Likewise, the second substrate 102 is disposed with a second conductive layer 102a, which includes a plurality of parallel strip electrodes 1021 and grooves, on a side thereof facing the first substrate 101; wherein the strip electrodes 1021 of the second conductive layer 102a are arranged along a second direction d2. In this embodiment, the second conductive layer 102a is electrically coupled to a second voltage source V2, which is configured to apply a second voltage for driving the switching unit 10. In this embodiment, the second conductive layer 102a may have materials similar to or same as that in the first conductive layer 101a.

The first direction d1 and the second direction d2 are configured to have a non-zero angle therebetween; in this embodiment, this angle is 90 degrees and the present disclosure is not limited thereto.

The liquid crystal layer 103, disposed between the first substrate 101 and the second substrate 102, includes a plurality of liquid crystals 103a. Specifically, the light passing through the switching unit 10 has no optical retardation if the first polarization axis Pa1 and the slow axis (also called major axis) Sa of the liquid crystals 103a have a relative angle of 0 or 90 degrees therebetween. Alternatively, the light passing through the switching unit 10 has an optical retardation if the first polarization axis Pa1 and the slow axis Sa of the liquid crystals 103a have a relative angle neither of 0 or 90 degrees therebetween. Thus, by aligning the slow axes Sa of the liquid crystals 103a in a specified a direction according to corresponding requirements, the 3D image display apparatus 100 in accordance with the preferred embodiment of the present disclosure has lower manufacturing cost without the need of an additional adhered retardation film and a compensating film.

Figure 3B:
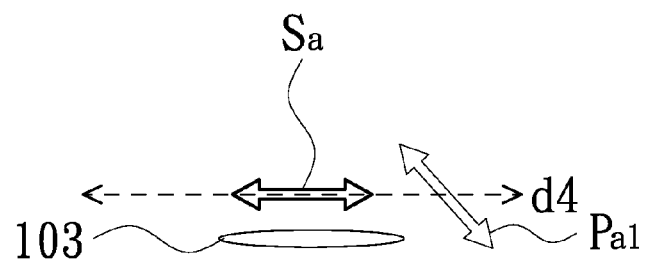
Figure 3C:
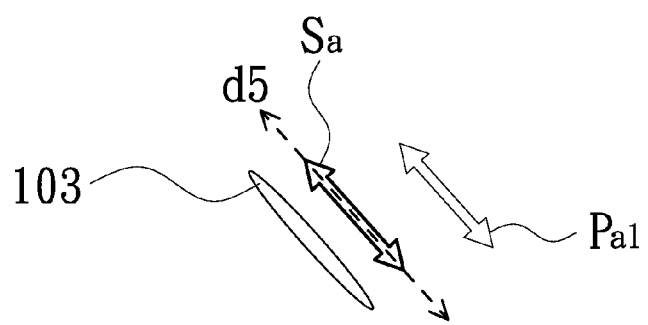

FIGS. 3A, 3B and 3C each are a schematic top view illustrating the slow axis Sa of the liquid crystals 103a with a specified angle relative to the first polarizing axis Pa1. Please refer to FIGS. 2A, 3A first. In a first period (e.g., a left-eyed picture period), an electric field E1 parallel to the liquid crystal layer 103 is generated by configuring the first voltage source V1 to apply an non-zero first voltage to the first conductive layer 101a and configuring the second voltage source V2 not to apply a voltage to the second conductive layer 102a. By the force resulted from the electric field E1, the slow axes Sa of the liquid crystals 103a are approximately aligned to a first-period-slow-axis direction d3 (as illustrated in FIG. 3A); wherein the relative angle between the first-period-slow-axis direction d3 and the first polarization axis Pa1 in the first period has a specified angle except 0 or 90 degrees, for example, the relative angle is 45 degrees. Thus, by this configuration of the switching unit 10, a corresponding optical retardation required for a 3D image formed in the first period is generated.

Please refer to FIGS. 2B, 3B. In a second period (e.g., a right-eyed picture period), an electric field E2 perpendicular to the liquid crystal layer 103 is generated by configuring the second voltage source V2 to apply an non-zero second voltage to the second conductive layer 102a and configuring the first voltage source V1 not to apply a voltage to the first conductive layer 101a. By the force resulted from the electric field E2, the slow axes Sa of the liquid crystals 103a are approximately aligned to a second-period-slow-axis direction d4 (as illustrated in FIG. 3B); wherein the relative angle between the second-period-slow-axis direction d4 and the first polarization axis Pa1 in the second period has a specified angle except 0 or 90 degrees, for example, the relative angle is 45 degrees. Thus, by this configuration of the switching unit 10, a corresponding optical retardation required for a 3D image formed in the second period is generated.

Please refer to FIGS. 2C, 3C. In an initial period, the slow axes Sa of the liquid crystals 103a are maintained in an initial direction d5 (as illustrated in FIG. 3C) by configuring the first voltage source V1 and the second voltage source V2 to apply no voltage to the first conductive layer 101a and the second conductive layer 102a, respectively; wherein the relative angle between the initial direction d5 and the first polarization axis Pa1 in the initial period has a specified angle of either 0 or 90 degrees. In other words, the slow axes Sa of the liquid crystals 103a are parallel or perpendicular to the first polarization axis Pa1, and accordingly no optical retardation is generated by the switching unit 10 in the initial period.

Figure 4:
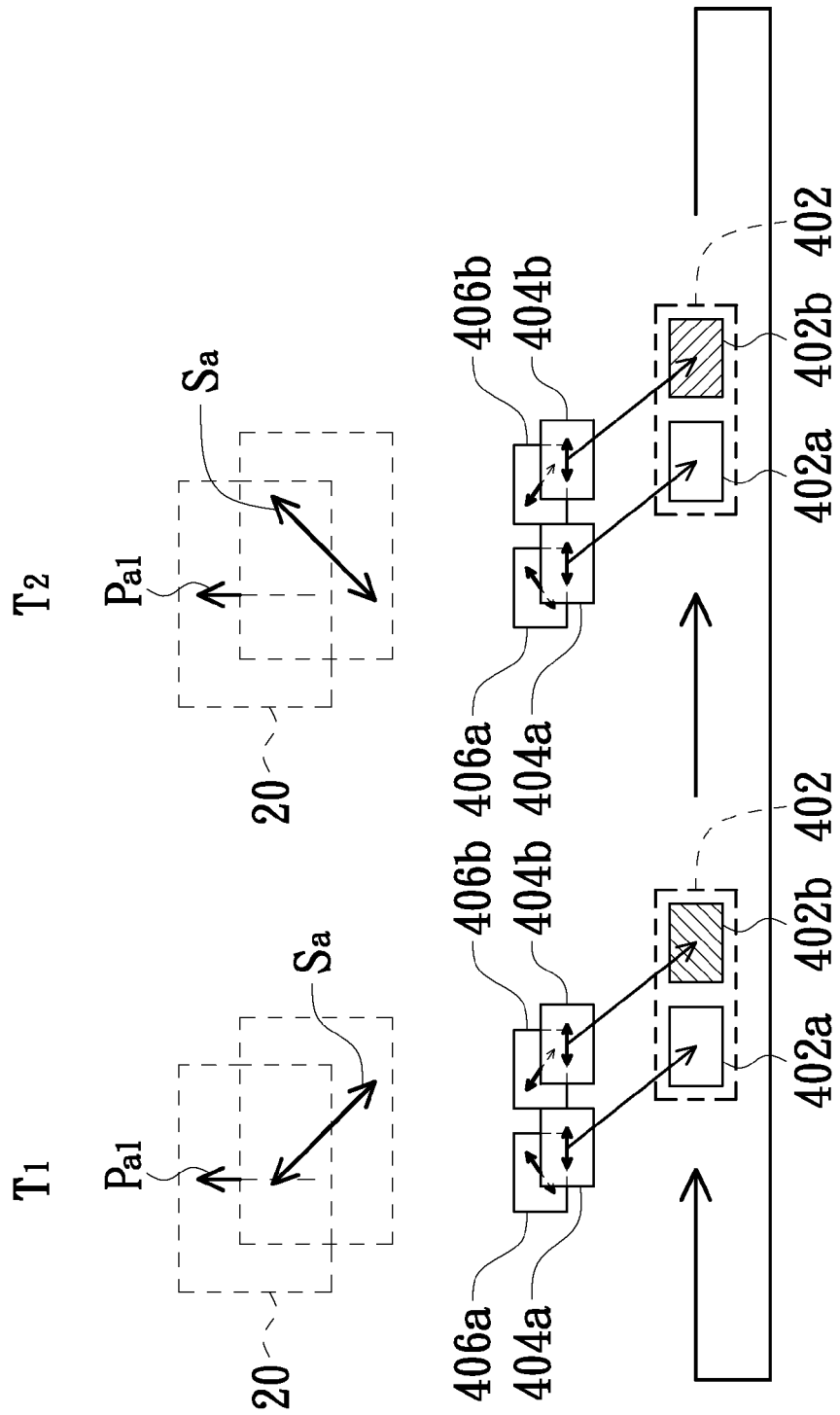
FIG. 4 is a schematic diagram illustrating the 3D image display apparatus equipped with a pair of polarized glasses.

It is understood that the 3D image display apparatus 100 shown in FIG. 1 may further include a pair of polarized glasses. FIG. 4 is a schematic diagram illustrating the 3D image display apparatus 100 equipped with a pair of polarized glasses 402. As shown, the polarized glasses 402 include a left-eyed lens 402a and a right-eyed lens 402b, which respectively include circular polarizers 406a, 406b having different polarization axes. In some other embodiments, the left-eyed lens 402a and right-eyed lens 402b further include line polarizers 404a, 404b, respectively.

Please refer to FIGS. 1, 2A and 4. In the first period T1, because the circular polarizer 406b of the right-eyed lens 402b of the pair of polarized glasses 402 is configured to have the polarization axis thereof parallel to the slow axes Sa of the liquid crystals 103a, accordingly a user can watch the image displayed by the display unit 30 through the right-eyed lens 402b. In this embodiment, because the polarization direction of the circular polarizer 406a of the left-eyed lens 402a is approximately perpendicular to that of the circular polarizer 406b of the right-eyed lens 402b, and the circular polarizer 406a of the left-eyed lens 402a has an optical retardation value same as or difference within ±15 nm from the unit 10 of the liquid crystals optical retardation value, the image displayed by the display unit 30 is blocked by the left-eyed lens 402a and accordingly the user cannot watch the image displayed by the display unit 30 through the left-eyed lens 402a in the first period T1.

Please refer to FIGS. 1, 2B and 4. In the second period T2, by aligning the slow axes Sa of the liquid crystals 103a to have an angle of 45 degrees relative to the first polarization axis Pa1, the circular polarizer 406a of the left-eyed lens 402a of the pair of polarized glasses 402 is configured to have the polarization axis thereof parallel to the slow axes Sa of the liquid crystals 103a, accordingly a user can watch the image displayed by the display unit 30 through the left-eyed lens 402a. Likewise, because the polarization direction of the circular polarizer 406a of the left-eyed lens 402a is approximately perpendicular to that of the circular polarizer 406b of the right-eyed lens 402b, and the circular polarizer 406b of the right-eyed lens 402b has an optical retardation value same as or difference within ±15 nm from the unit 10 of the liquid crystals optical retardation value, the image displayed by the display unit 30 is blocked by the right-eyed lens 402b and accordingly the user cannot watch the image displayed by the display unit 30 through the right-eyed lens 402b in the second period T2.

Please refer to FIGS. 1, 2C and 4. In an initial period of being applied with no voltage, the slow axis Sa of the liquid crystals 103a and the first polarization axis Pa1 of the first polarizer 20 are configured to have an angle of about 0 degree or 90 degrees therebetween; and accordingly the slow axis Sa has a specified angle (for example, a 45-degree angle) relative to both of the polarization axis of the circular polarizer 406a of the left-eyed lens 402a and the polarization axis of the circular polarizer 406b of the right-eyed lens 402b. Thus, the user can watch the image displayed by the display unit 30 through the left-eyed lens 402a and the right-eyed lens 402b in the initial period. Display unit 30 can apply the black status in this period to improve the 3D performance.

Therefore, through driving the first conductive layer 101a and the second conductive layer 102a of the switching unit 10 by the aforementioned specified sequence and thereby changing the extension direction of the slow axis Sa, the slow axis Sa and the first polarization axis Pa1 of the first polarizer 20 can be configured to have a specified angle therebetween equal to neither 0 nor 90 degrees so as to consequently generate a specified optical retardation. When the slow axes Sa of the liquid crystals 103a are configured, by the aforementioned specified sequence, to be sequentially parallel to the polarization axes of the left-eyed lens 402a and right-eyed lens 402b of the polarized glasses 402, the user can watch 3D images through the polarized glasses 402.

The present disclosure also provides a driving method for a 3D image display apparatus, which includes steps of: providing the 3D image display apparatus comprising a display unit, a first polarizer having a polarization axis, a second polarizer and a switching unit, wherein the first polarizer is disposed between the switching unit and the display unit, the second polarizer is disposed on the other side of the display unit, the switching unit comprises a first substrate, a second substrate and a liquid crystal layer, the first substrate comprises a first conductive layer arranged along a first direction, the second substrate is parallel to the first substrate and comprises a second conductive layer arranged along a second direction, the first and second directions have an angle therebetween, the liquid crystal layer is disposed between the first and second substrates and comprises a plurality of liquid crystals each having a slow axis, the slow axes of the liquid crystals are aligned in an initial direction by applying no voltage to the first and second conductive layers, the initial direction is parallel or perpendicular to the first polarizer direction; applying, in a first period, a first voltage to the first conductive layer thereby aligning the slow axes of the liquid crystals in a first-period-slow-axis direction, wherein the first-period-slow-axis direction and the polarization axis of the first polarizer have a first angle therebetween; and applying, in a second period, a second voltage to the second conductive layer thereby aligning the slow axes of the liquid crystals in a second-period-slow-axis direction, wherein the second-period-slow-axis direction and the polarization axis of the first polarizer have a second angle therebetween, the first and second angles each are equal neither to 0 nor 90 degrees, and the first period is different with the second period.

In summary, by sequentially driving the first conductive layer 101a and the second conductive layer 102a and thereby sequentially generating a parallel electric field and a vertical electric field in the switching unit 10, a specified optical retardation for forming 3D images is resulted in without the additional retardation film and the compensation film. Thus, the 3D image display apparatus 100 of the present disclosure has a lower manufacturing cost and the switching unit 10 has a simpler design without retardation films.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A three-dimensional (3D) image display apparatus, comprising:
   a display unit;
   a first polarizer having a polarization axis;
   a second polarizer, wherein the first and second polarizers are disposed on two opposite sides of the display unit, respectively; and
   a switching unit, wherein the switching unit and the display unit are disposed on two opposite sides of the first polarizer, respectively, and the switching unit comprises:
      a first substrate disposed with a first conductive layer on an inner surface thereof, wherein the first conductive layer comprises a first plurality of parallel strip electrodes along a first direction and a first plurality of grooves intercalating the first plurality of parallel strip electrodes and is electrically coupled to a first voltage source configured to only apply a first voltage to generate a first electric field perpendicular to the first direction during a first time period;

a second substrate parallel to the first substrate and disposed with a second conductive layer on an inner surface thereof, wherein the second conductive layer comprises a second plurality of parallel strip electrodes along a second direction different from the first direction and a second plurality of grooves intercalating the second plurality of parallel strip electrodes and is electrically coupled to a second voltage source configured to only apply a second voltage to generate a second electric field perpendicular to the second direction during a second time period different from the first time period; and a liquid crystal layer disposed between the first substrate and the second substrate, the liquid crystal layer comprising a plurality of liquid crystals aligned in an initial direction when no voltage is applied to the first and second conductive layers;

wherein the liquid crystals are aligned in the first direction having a first angle relative to the polarization axis of the first polarizer by the first electric field during the first time period, and the liquid crystals are aligned in the second direction having a second angle relative to the polarization axis of the first polarizer by the second electric field during the second time period; wherein the initial direction, first direction, and second direction are different from one another.

2. The 3D image display apparatus according to claim 1, wherein the first and second conductive layers each comprise a plurality of electrodes arranged in parallel, and the first direction is different with the second direction.

3. The 3D image display apparatus according to claim 1, wherein the first direction is perpendicular to the second direction.

4. The 3D image display apparatus according to claim 1, further comprising a pair of polarized glasses with a left-eyed lens and a right-eyed lens.

5. The 3D image display apparatus according to claim 4, wherein the left-eyed lens and the right-eyed lens each comprise a circular polarizer, the circular polarizer of the left-eyed lens has a left-polarization axis and the circular polarizer of the right-eyed lens has a right-polarization axis, the right-polarization axis is parallel to the first direction, and the left-polarization axis is parallel to the second direction.

6. The 3D image display apparatus according to claim 5, wherein the left-polarization axis is perpendicular to right-polarization axis.

7. The 3D image display apparatus according to claim 5, wherein the left-eyed lens and the right-eyed lens each comprise a line polarizer, and the line polarizer is aligned to be a first polarizer disposed on the polarized glasses.

8. The 3D image display apparatus according to claim 1, wherein the initial direction is parallel or perpendicular to the polarization axis of the first polarizer.

9. A driving method for a three-dimensional (3D) image display apparatus, comprising:

providing the 3D image display apparatus comprising a display unit, a first polarizer having a polarization axis, a second polarizer and a switching unit, wherein the first polarizer is disposed between the switching unit and the display unit, the second polarizer is disposed on the other side of the display unit, the switching unit comprises a first substrate, a second substrate and a liquid crystal layer, the first substrate comprises a first conductive layer arranged along a first direction, the first conductive layer comprises a first plurality of parallel strip electrodes and a first plurality of grooves intercalating the first plurality of parallel strip electrodes, the second substrate is parallel to the first substrate and comprises a second conductive layer arranged along a second direction, the second conductive layer comprises a second plurality of parallel strip electrodes and a second plurality of grooves intercalating the second plurality of parallel strip electrodes, the liquid crystal layer is disposed between the first and second substrates and comprises a plurality of liquid crystals aligned in an initial direction when no voltage is applied to the first and second conductive layers, the initial direction is parallel or perpendicular to the polarization axis;

applying a first voltage to the first conductive layer for generating a first electric field perpendicular to the first direction during a first time period only, thereby the liquid crystals are aligned in the first direction having a first angle relative to the polarization axis by the first electric field during the first time period; and applying a second voltage to the second conductive layer for generating a second electric field perpendicular to the second direction during a second time period only, thereby the liquid crystals are aligned in the second direction having a second angle relative to the polarization axis by the second electric field during the second time period; wherein the initial direction, first direction, and second direction are different from one another.

10. The driving method according to claim 9, further comprising:

providing a pair of polarized glasses with a left-eyed lens and a right-eyed lens, wherein the left-eyed lens and the right-eyed lens comprise a left polarizer and a right polarizer, respectively, the left polarizer has a left-polarization axis and the right polarizer has a right-polarization axis, the left-polarization axis is parallel to the first direction, and the right-polarization axis is parallel to the second direction.

11. The driving method according to claim 10, wherein the left-polarization axis and the right-polarization axis are perpendicular to each other.

* * * * *